(12) United States Patent
Surnilla et al.

(10) Patent No.: US 7,703,435 B2
(45) Date of Patent: Apr. 27, 2010

(54) SYSTEM AND CONTROL METHOD FOR SELECTING FUEL TYPE FOR AN INTERNAL COMBUSTION ENGINE CAPABLE OF COMBUSTING A PLURALITY OF FUEL TYPES

(75) Inventors: Gopichandra Surnilla, West Bloomfield, MI (US); Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 12/110,793

(22) Filed: Apr. 28, 2008

(65) Prior Publication Data
US 2009/0271090 A1    Oct. 29, 2009

(51) Int. Cl.
*F02M 43/00* (2006.01)
*F02B 7/06* (2006.01)

(52) U.S. Cl. .................. 123/304; 123/27 GE; 123/525; 123/526

(58) Field of Classification Search ............. 123/27 GE, 123/304, 525, 526
See application file for complete search history.

(56) References Cited

U.S. PATENT DOCUMENTS

| | | | |
|---|---|---|---|
| 3,659,574 A | 5/1972 | Reschke et al. | |
| 3,766,734 A | 10/1973 | Jones | |
| 4,031,864 A | 6/1977 | Crothers | |
| 4,129,620 A * | 12/1978 | Etoh | 261/18.3 |
| 4,838,295 A | 6/1989 | Smith et al. | |
| 5,735,253 A | 4/1998 | Perotto et al. | |
| 5,832,905 A * | 11/1998 | King et al. | 123/525 |
| 6,026,787 A | 2/2000 | Sun et al. | |
| 6,321,694 B1 * | 11/2001 | Vergine et al. | 123/27 GE |
| 7,159,568 B1 * | 1/2007 | Lewis et al. | 123/431 |
| 7,255,080 B1 | 8/2007 | Leone | |
| 7,278,396 B2 | 10/2007 | Leone | |
| 7,287,492 B2 | 10/2007 | Leone et al. | |
| 7,293,552 B2 | 11/2007 | Leone et al. | |
| 7,302,932 B2 | 12/2007 | Shelby et al. | |
| 7,314,033 B2 | 1/2008 | Cohn et al. | |
| 7,331,334 B2 | 2/2008 | Leone et al. | |
| 7,337,754 B2 | 3/2008 | Dearth et al. | |
| 7,357,101 B2 | 4/2008 | Boyarski | |
| 7,546,834 B1 * | 6/2009 | Ulrey et al. | 123/525 |
| 2002/0148229 A1 | 10/2002 | Pont et al. | |
| 2006/0101823 A1 | 5/2006 | Takemoto et al. | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2007/0215110 A1 * | 9/2007 | Stein et al. | 123/431 |

OTHER PUBLICATIONS

U.S. Appl. No. 11/291,789, filed Nov. 30, 2005, Lewis et al.

(Continued)

*Primary Examiner*—Erick Solis
(74) *Attorney, Agent, or Firm*—Allan J. Lippa; Alleman Hall McCoy Russell & Tuttle LLP

(57) ABSTRACT

A system and method for improving fuel usage of a dual fuel engine is described. Fuel type is delivered to engine cylinders in response to operating conditions.

22 Claims, 3 Drawing Sheets

OTHER PUBLICATIONS

U.S. Appl. No. 11/291,811, filed Nov. 30, 2005, Lewis et al.
U.S. Appl. No. 11/291,809, filed Nov. 30, 2005, Leone et al.
U.S. Appl. No. 11/291,387, filed Nov. 30, 2005, Leone et al.
U.S. Appl. No. 11/291,788, filed Nov. 30, 2005, Leone et al.
U.S. Appl. No. 11/291,810, filed Nov. 30, 2005, Leone.
U.S. Appl. No. 11/291,809, filed Nov. 30, 2005, Lewis et al.
U.S. Appl. No. 11/291,362, filed Nov. 30, 2005, Lewis et al.
U.S. Appl. No. 11/291,289, filed Nov. 30, 2005, Lewis et al.
U.S. Appl. No. 11/384,074, filed Mar. 17, 2006, Fried et al.
U.S. Appl. No. 11/846,373, filed Aug. 28, 2007, Leone et al.
U.S. Appl. No. 11/384,142, filed Mar. 17, 2006, Dearth et al.
U.S. Appl. No. 11/384,097, filed Mar. 17, 2006, Shelby et al.
U.S. Appl. No. 11/378,671, filed Mar. 17, 2006, Stein et al.
U.S. Appl. No. 11/378,203, filed Mar. 17, 2006, Hahn.
U.S. Appl. No. 11/384,111, filed Mar. 17, 2006, Leone.
U.S. Appl. No. 11/378,589, filed Mar. 17, 2006, Leone.
U.S. Appl. No. 11/378,673, filed Mar. 17, 2006, Surnilla.
U.S. Appl. No. 11/384,141, filed Mar. 17, 2006, Dearth et al.
U.S. Appl. No. 11/378,765, filed Mar. 17, 2006, Dearth et al.
U.S. Appl. No. 11/776,120, filed Jul. 11, 2007, Stein et al.
U.S. Appl. No. 11/464,172, filed Aug. 11, 2006, Stein.
U.S. Appl. No. 11/566,131, filed Dec. 1, 2006, Blumberg et al.
U.S. Appl. No. 11/690,755, filed Mar. 23, 2007, Dearth et al.

* cited by examiner

SYSTEM AND CONTROL METHOD FOR SELECTING FUEL TYPE FOR AN INTERNAL COMBUSTION ENGINE CAPABLE OF COMBUSTING A PLURALITY OF FUEL TYPES

FIELD

The present description relates to a system and method for delivering two different fuel types to at least one cylinder of an internal combustion engine.

BACKGROUND

A system for operating a dual fuel engine is described in U.S. Pat. No. 6,026,787. This patent describes a supplying fuel to a cylinder of an engine using a carburetor and a port fuel injector. The port fuel injector timing of one engine controller is intercepted by another engine controller and reduced by an amount that is relative to the amount of fuel introduced to the engine by the carburetor. If one of the fuels is depleted then the engine is operated on a single fuel.

The above-mentioned system can also have several disadvantages. Namely, the system recognizes only a few modes to operate a dual fuel engine. Further, the recognized modes are not selected in a manner that leverages the attributes and quantity of a particular fuel.

The inventors herein have recognized the above-mentioned disadvantages and have developed a system and method that offers substantial improvements.

SUMMARY

One embodiment of the present description includes a system for selecting a type of fuel to combust in an internal combustion engine, the system comprising: a first injector for injecting a first fuel to an internal combustion engine; a second injector for injecting a second fuel to said internal combustion engine; and a controller configured to activate and deactivate said first fuel injector in response to the amount of fuel stored in a first fuel storage tank and in response to the amount of fuel stored in a second fuel storage tank, said first fuel storage tank capable of supplying fuel to said first injector and said second fuel storage tank capable of supplying fuel to said second injector. This system overcomes at least some disadvantages of the above-mentioned system.

The allocation of fuel supplied to a dual fuel engine can be improved by taking the amount and type of each fuel supplied to the engine into consideration. For example, if two different fuel types can be supplied to an engine, it can be desirable to deactivate (i.e., temporarily stop fuel from being delivered from an injector) one injection source and conserve one type of fuel that has a desirable attribute for operating the engine at particular conditions. In this way, the quantity and attributes of each fuel type can be leveraged to improve engine emissions, the amount of available engine operating time, and engine performance.

In one embodiment, the present description provides for an engine configured to operate using compressed natural gas (CNG), gasoline, or a mixture of CNG and gasoline. Rather than operating the engine on one type of fuel until a fuel storage tank holding the fuel is nearly empty, the present description provides a system and method for selecting fuel for particular engine operating conditions from a plurality of fuel sources in response to the type or attributes of each fuel as well as in response to the amount of fuel available from each of the fuel storage tanks.

The present description can provide several advantages. In particular, the system and method can extend a vehicle's mileage range by selecting a fuel from a plurality of fuel sources that provides a high level of engine efficiency at a particular driver demand. Further, the system and method can improve engine emissions by reserving a particular fuel for starting when the amount of that type of fuel is less than a predetermined amount. Further still, the system and method can increase the use of a particular type of fuel in comparison to another fuel if the fuel is available and is known to be lower in cost.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
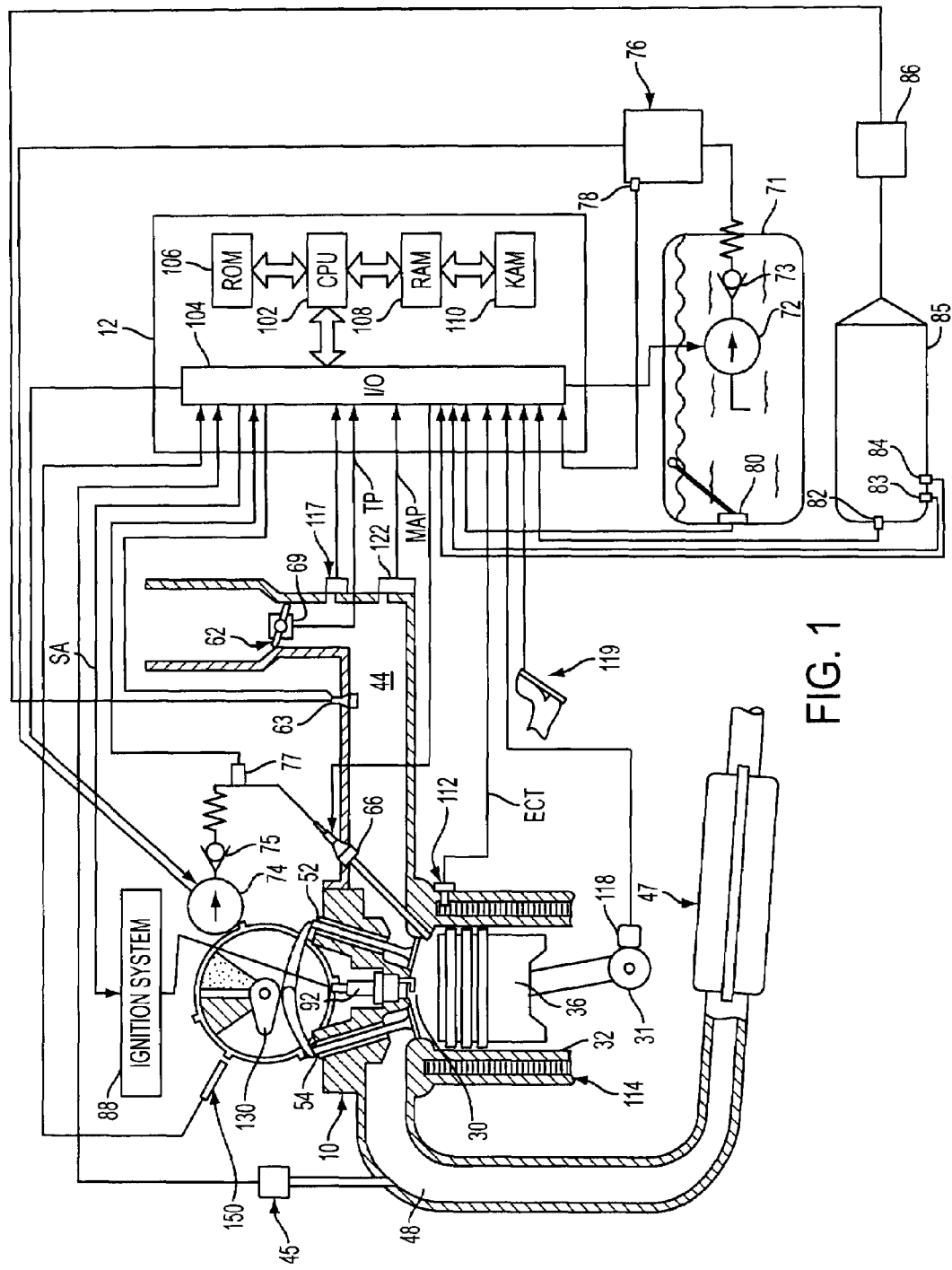
FIG. 1 is a schematic diagram of an engine, its fuel system, and its control system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 31. Combustion chamber 30 is known communicating with intake manifold 44 and exhaust manifold 48 via respective intake valve 52 an exhaust valve 54. Each intake and exhaust valve is operated by a mechanically drive cam 130. Alternatively, intake valves and/or exhaust valves may be operated by one or more electrically actuated valves. Intake manifold 44 is shown communicating with optional electronic throttle 62.

Fuel can be injected to engine 10 in several ways. Gaseous fuel (e.g., natural gas, propane, and fuels that assume a vapor state near ambient temperature and pressure) may be injected to intake manifold 44 by way of injector 63 or alternatively directly into the cylinder. Gaseous fuel injector 63 is supplied fuel from storage tank 85 by way of pressure regulator 86. Fuel is stored in tank 85 at a first fuel pressure that varies as the amount of fuel stored in the fuel tank varies. The first fuel pressure is reduced to a second pressure at regulator 86 before the fuel is delivered to engine 10. If desired, propane or heated gasoline may be injected in either a gaseous or liquid state. The fuels can be injected as a liquid when the fuel pressure is above roughly 700 kPa and as a gas when the fuel pressure is below roughly 700 kPa.

In the illustrated embodiment, liquid fuel can also be injected directly in to cylinder 30 by way of injector 66. Alternatively, fuel may be injected into the cylinder port, if desired. The amount of fuel delivered is proportional to the pulse width of signal sent to the fuel injector from controller 12. Fuel is delivered to fuel injector 66 by injection pump 74. The injection pump may be mechanically driven by the engine or electrically driven. Check valve 75 allows fuel flow from injection pump 74 to fuel injector 66 and limits flow from fuel injector 66 to injection pump 74. Lift pump 72 provides fuel from fuel tank 71 to fuel injection pump 74. Lift pump 72 may be electrically or mechanically driven. Check valve 73 allows fuel to flow from fuel pump 72 and limits fuel flow backwards into fuel pump 72. Pressure accumulator 76 hold a volume of fuel that reduces the rate of fuel pressure increase or decrease between fuel pump 72 and fuel injection pump 74. The volume of accumulator 76 may be sized such that engine 10 can operate at idle conditions for a predetermined period of time between operating intervals of fuel pump 72. For example, accumulator 76 can be sized such that when engine 10 idles, it takes one or more minutes to deplete pressure in accumulator 76 to a level at which fuel pump 74 is incapable of maintaining a desired pressure to fuel injector 66.

Note that the lift pump and/or injection pumps described above may be electrically, hydraulically, or mechanically driven without departing from the scope or breadth of the present description.

Distributor-less ignition system 88 provides ignition spark to combustion chamber 30 via spark plug 92 in response to controller 12. Universal Exhaust Gas Oxygen (UEGO) sensor 45 is shown coupled to exhaust manifold 48 upstream of catalytic converter 47. Converter 47 can include multiple catalyst bricks, in one example. In another example, multiple emission control devices, each with multiple bricks, can be used. Converter 47 can be a three-way type catalyst in one example.

Controller 12 is shown in FIG. 1 as a conventional microcomputer including: microprocessor unit 102, input/output ports 104, and read-only-memory 106, random-access-memory 108, Keep-alive-memory 110, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a fuel rail pressure sensor 77; engine knock sensor (not shown); fuel amount (level) sensor 80; fuel amount (pressure) sensor 82; sonic gas sensor 83; gas temperature sensor 84; cam position sensor 150; optional accumulator fuel pressure sensor 78; a throttle position sensor 69; a measurement (ACT) of engine air amount temperature or manifold temperature from temperature sensor 117; a engine position sensor from a Hall effect sensor 118 sensing crankshaft 31 position; and power driver circuitry capable of providing actuating energy to actuate valves as well as capability to provide current for heating valve actuators. In one aspect of the present description, engine position sensor 118 produces a predetermined number of equally spaced pulses every revolution of the crankshaft from which engine speed (RPM) can be determined.

Storage medium read-only memory 106 can be programmed with computer readable data representing instructions executable by processor 102 for performing the methods described below as well as other variants that are anticipated but not specifically listed.

Figure 2:
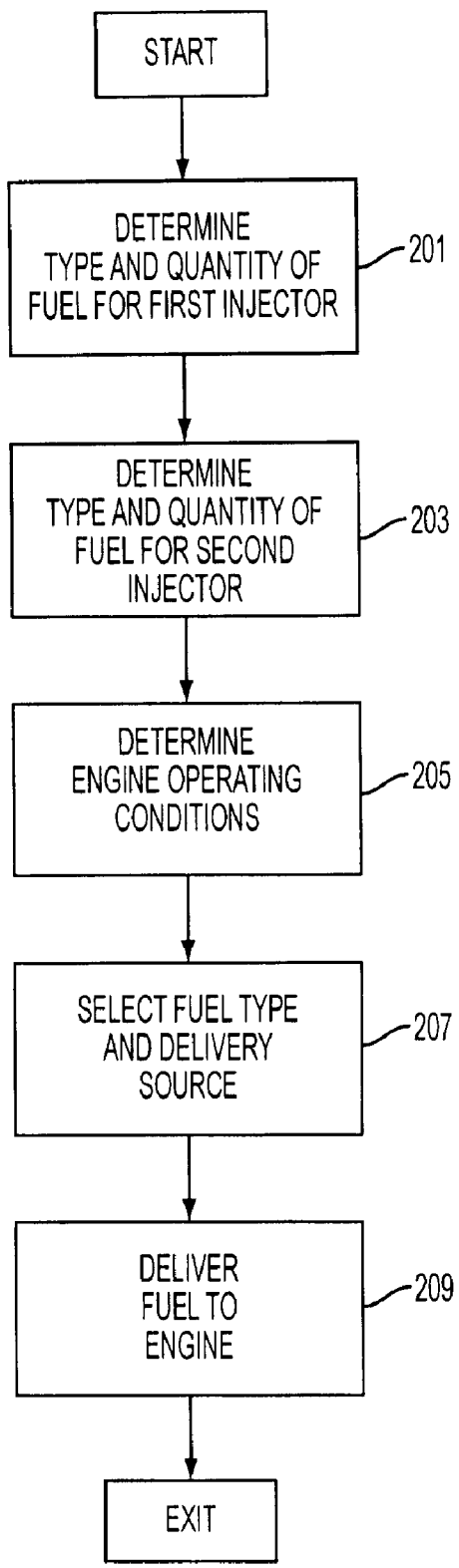
FIG. 2 is a flowchart of an example fuel injection control strategy.

Referring now to FIG. 2, a flow chart of an example fuel selection method is shown. At step 201, the routine determines the type and quantity of fuel that may be injected to the engine by way of a first fuel injector. In one embodiment, a first fuel injector is configured to inject fuel that takes on a gaseous state at ambient temperature and pressure (e.g., natural gas, hydrogen, propene, or propane). The amount of a gaseous fuel available to combust in an engine can be determined from the ideal gas law and knowing or determining gas pressure, gas temperature, and the gas storage device volume. For example, FIG. 1 pressure sensor 82 and temperature sensor 84 can be used to determine the amount of fuel stored in fuel storage tank 85. Further, the stored gas composition can be determined by using a sensor that assesses sonic speed of a gas because the sonic speed of a gas is related to the gas composition.

In an alternative embodiment, a liquid fuel may be substituted for the gaseous fuel described above. The liquid fuel may be comprised of but not limited to ethanol, methanol, or a combination of gasoline and ethanol. If a liquid fuel is injected by the first injector, the liquid fuel amount can be determined from a float sensor or another known means. After determining the quantity and type of fuel in step 201, the routine proceeds to step 203.

At step 203, the routine determines the type and quantity of fuel that may be injected to the engine by way of a second fuel injector.

The second fuel injector is configured to inject a liquid fuel (i.e., a fuel that assumes a liquid state at ambient temperature and pressure) to the engine. For example, anticipated but not limiting types of liquid fuels include gasoline, ethanol, and mixtures of gasoline and ethanol.

The fuel type injected to the engine may be determined by a fuel sensor or it may be determined from known methods that use the amount of fuel injected and the exhaust gas air-fuel ratio.

The amount of fuel available to supply to the second injector can be determined by a fuel level sensor. For example, the amount of fuel available to the second fuel injector illustrated in FIG. 1 can be determined from fuel level sensor 80. This type of sensor floats at the level of fuel in the fuel tank. By knowing the fuel tank volume and level, the amount of stored fuel can be determined. After determining the quantity and type of fuel in step 203, the routine proceeds to step 205.

Of course, if desired, the gaseous fuel tank volume can be computed by the resulting pressure drop given a known mass extracted from the fuel tank during injection. This allows the controller to compute and detect the tank volume in the vehicle.

At step 205, the routine determines engine operating conditions. Engine operating conditions are determined by querying engine and/or vehicle sensors. In one embodiment, engine coolant temperature is determined along with driver demand torque, ambient air temperature, time since start, number of combustion events for each cylinder since engine crank, engine load, catalyst temperature, and engine knock. However, additional or fewer engine operating conditions may be determined or inferred from engine sensors if desired. The routine proceeds from step 205 to step 207.

At step 207, the routine selects the fuel type and method to deliver fuel to the engine. In one embodiment, the routine uses engine operating conditions and the quantity and types of fuel available to deliver to the engine to select which fuel is desirable to combust during the current engine cycle given the available information. In other embodiments, fuel quantity in each fuel storage tank and the engine mode may be used to select which fuel to combust during an engine cycle. For example, fuel type and injection source can be determined from a fuel control matrix (i.e., a memory structure accessible by a microprocessor that contains retrievable data), such as the one illustrated in FIG. 3, that holds engine modes and fuel types and delivery sources. In one embodiment, the matrix is indexed by the fuel type and quantity of fuel type available. More specifically, the matrix rows are indexed by determining the amount of gasoline or liquid fuel that is available to inject via the second injector. The routine may be configured to have one or more fuel amounts from which the number of matrix rows is determined. For example, one row may represent a quantity of liquid fuel that less than 2 liters while a second row represents a quantity of fuel that represents from 2 to 40 liters.

Likewise, matrix columns are indexed by the type of gaseous fuel and by the amount of gaseous fuel available to be delivered to the engine by way of the first fuel injector. In one example, the fuel control matrix can be indexed by the amount of fuel pressure observed in a fuel storage tank. In another example embodiment, the fuel control matrix can be indexed using a gasoline gallon equivalent (GGE) estimate of the stored gaseous fuel. In other words, an observed fuel pressure and temperature are used in conjunction with a known volume fuel storage tank to determine the amount (mass) of stored gaseous fuel. The determined amount of gaseous fuel is then converted into a gasoline gallon equivalent by multiplying the stored mass of gaseous fuel by the energy density of the gaseous fuel. This product is the total amount of energy stored in the gaseous fuel tank. The amount of stored energy is then divided by the energy density of a gallon of gasoline to yield a gasoline gallon equivalent amount of fuel stored in the fuel storage tank. The fuel control matrix can then be indexed based on the gasoline gallon equivalent of stored gaseous fuel. Using a gasoline gallon equivalent measure of stored gaseous fuel allows the routine to normalize energy properties of different fuels so that the fuel selection process can consider vehicle range as part of the fuel selection process.

Note that other fuels, including liquid fuels, can also be converted to GGE amounts (or Diesel gallon equivalent, etc.). For example, a fuel control matrix may be indexed by ethanol GGE and gasoline if desired.

Each row and column pair indexes a matrix location that contains an engine mode and fuel type that is associated with a particular engine mode. Each row and column pair may contain unique fuel commands so that as operating conditions (i.e., engine and fuel storage) vary, different fuel types may delivered to the engine.

In one example embodiment, each fuel control matrix cell contains fuel delivery instructions for starting mode, catalyst heating mode, load above gasoline knock limit mode, above and below gaseous load limit modes, and catalyst cooling mode. However, the number of modes may be increased or decreased for a particular application and are therefore not intended to limit the scope of breadth of this description.

In addition, the present system and method are not restricted to a two dimensional fuel control matrix. Higher dimension fuel control matrices are also anticipated. In one example embodiment, the fuel control matrix is a three dimensional structure that is indexed by two fuel types and quantities as well as an index that describes a cost relationship between GGE of each fuel type. The matrix's third dimension allows the system to adjust fuel type and delivery mode in response to the cost of each fuel, the amount of each type of fuel stored, and the fuel type or fuel attributes.

Further, the fuel control strategy may be comprised of a plurality of fuel control matrices. For example, one matrix may be indexed based on gasoline and CNG while another matrix may be indexed based on ethanol and CNG. If the driver changes fuels, fuel control can switch from one matrix to the other so that the fuel delivered during a particular engine operating mode is related to the fuel type. However, a single fuel control matrix that is indexed by the amount of fuel stored in first fuel tank and the amount of fuel stored in a second is also possible.

In one embodiment, starting mode may be defined as a period between when an engine is cranked (i.e., begins to rotate) until the engine reaches a predetermined speed under its own power. The predetermined engine speed may be an idle speed that the engine reaches after accelerating from crank speed (i.e., engine run-up). If desired, the starting mode may also include a period of time or a number of cylinder combustion events after the engine has reached the predetermined engine speed. Further, the predetermined engine speed and period of time after reaching the predetermined engine speed can be varied with engine operating conditions, if desired.

It should also be noted that engine cranking may be performed by a starter or by a secondary motor such as a hydraulic or electric motor. And in some hybrid applications, starting may comprise beginning to rotate the internal combustion engine, accelerating the engine to a desired engine speed, initiating combustion in the internal combustion engine, and operating the engine under its own power for a predetermined duration. Thus, the definition of starting mode can vary from application to application without extending beyond the scope or intent of the present description.

In one embodiment, catalyst heating mode may be defined as a period extending from engine start to when a catalyst reaches a predetermined temperature, such as a light-off temperature (i.e., a temperature at which a catalyst is capable of converting exhaust gas constituents at a desired conversion efficiency). In another embodiment, catalyst heating mode may be defined as a period during which spark timing is retarded from typical idle spark timing.

The above gasoline knock limit mode may be defined as a condition wherein an engine is operated using gasoline at an engine speed and above an engine load (engine load is a unit defined as the cylinder air charge divided by the theoretical cylinder air capacity, for example at 0.5 load a cylinder is inducting half the theoretical cylinder air charge capacity) where the engine has a higher propensity to knock. For example, an engine may begin to knock at a particular engine speed when cylinder load is greater than 0.75 load. If the engine operates above 0.75 load, at the same engine speed, the engine is in the above gasoline knock limit mode. Higher engine loads may be achieved under some circumstances by introducing a fuel having a higher octane number or knock resistance. For example, if an engine reaches the gasoline knock limit, ethanol or CNG may be delivered to one or more cylinders to improve engine performance.

The above maximum gaseous load mode is defined in one embodiment as an engine operating condition where engine load cannot be increased beyond an amount without enleaning the cylinder air-fuel above a predetermined amount. This mode may be encountered when an operator requests an engine torque amount or engine load amount that is not achievable at a particular engine operating condition when the engine is operated using a gaseous fuel. For example, if an engine is operating on compressed natural gas (CNG) the engine may only be capable of achieving 0.72 engine load (i.e., the achievable CNG engine load) at a stoichiometric air-fuel mixture. On the other hand, the engine may be able to achieve 0.84 engine load (i.e., the achievable engine load) when operated on different fuel or combination of fuels. Thus, when an engine load request exceeds 0.72 the engine is in the above gaseous load range.

Conversely, the engine is operated below gaseous load range in the above example when the engine load request is less than 0.72 engine load. In this mode, it is possible to achieve the desired engine load using only gaseous fuel.

It should be noted that the achievable engine load can vary with engine speed, load, and valve timing. As such, the specific numbers mentioned above are only for exemplary purposes and are not intended to limit the scope or breadth of this disclosure.

Catalyst cooling mode is a mode wherein selected measures are used to reduce or maintain the temperature of a catalyst. For example, catalyst temperature can be reduced by enriching a cylinder's air-fuel mixture. When the cylinder's air-fuel is increased, the excess fuel transfers a portion of thermal energy from the cylinder and catalyst, thereby cooling the catalyst. This mode may be encountered if an engine has been operated at elevated engine speed and load conditions.

For a naturally-aspirated, port-fueled injected engine, gaseous injection does not allow for catalyst/exhaust component cooling via running rich since the additional gaseous fuel displaces air, thus reducing cylinder air charge. However, a boosted engine or a gaseous directly-injected engine could do catalyst cooling via running rich.

As described above, fuel type and stored quantity one way used to index the fuel control matrix. Once conditions have been determined, the matrix is indexed and the fuel and fuel injector (or delivery means) are selected for the present operating conditions.

In one embodiment, where CNG and gasoline are used to fuel the engine, the fuel control matrix is populated to achieve the following objectives: if out of CNG operate using gasoline; if out of gasoline use CNG; if CNG is cheaper than gasoline operate engine using CNG except where gasoline can be added to improve engine performance; if stored CNG amount is low conserve it for starting and catalyst heating; if stored CNG amount is very low conserve it for starts; if stored gasoline amount is low conserve it for catalyst cooling and higher engine loads; if stored CNG amount is low and stored gasoline amount is high, use CNG in the range of gasoline knock limit operation; if stored CNG amount is high and stored gasoline amount is high, use gasoline to extend the engine power limit at higher engine loads. After selecting the fuel type, the routine proceeds to step 209.

At step 209, the routine delivers the selected fuel type by the selected delivery method. When the engine is operated in one of the above-mentioned modes, fuel is delivered corresponding to the entry stored in the fuel control matrix. The engine transitions between modes as engine operating conditions vary and as the amount each type of stored fuel varies during engine operation. The routine proceeds to exit after step 209.

Thus, the method described in FIG. 2 allows an engine controller to activate and deactivate different fuel delivery systems, including first and second fuel injectors and fuel pumps, in response to the amount of fuel and type of fuel available in either a first or second fuel storage tank wherein the fuel tanks supply fuel to the fuel injectors. This permits the engine controller to increase the use of one type of fuel over the other type of fuel to reduce engine operating costs. Alternatively, vehicle range can be extended by selecting to combust a fuel that increased engine efficiency during particular operating conditions. Further, the system and method permit activation and deactivation fuel injection of one of the first or second injectors in response to the amount of fuel stored in the first or second fuel tank that supplies fuel to the other of the first and second fuel injectors. Further still, one of the first or second fuel injectors may also be deactivated if the engine is started and the fuel in said first fuel storage tank is below a predetermined amount. This allows the engine controller to reserve a particular fuel for starting to lower engine emissions. Even further yet, one of the first or second fuel injectors may also be deactivated if the amount of fuel stored in the first or second fuel tank is less than a predetermined amount and if the engine is operated above a predetermined engine load.

Figure 3:
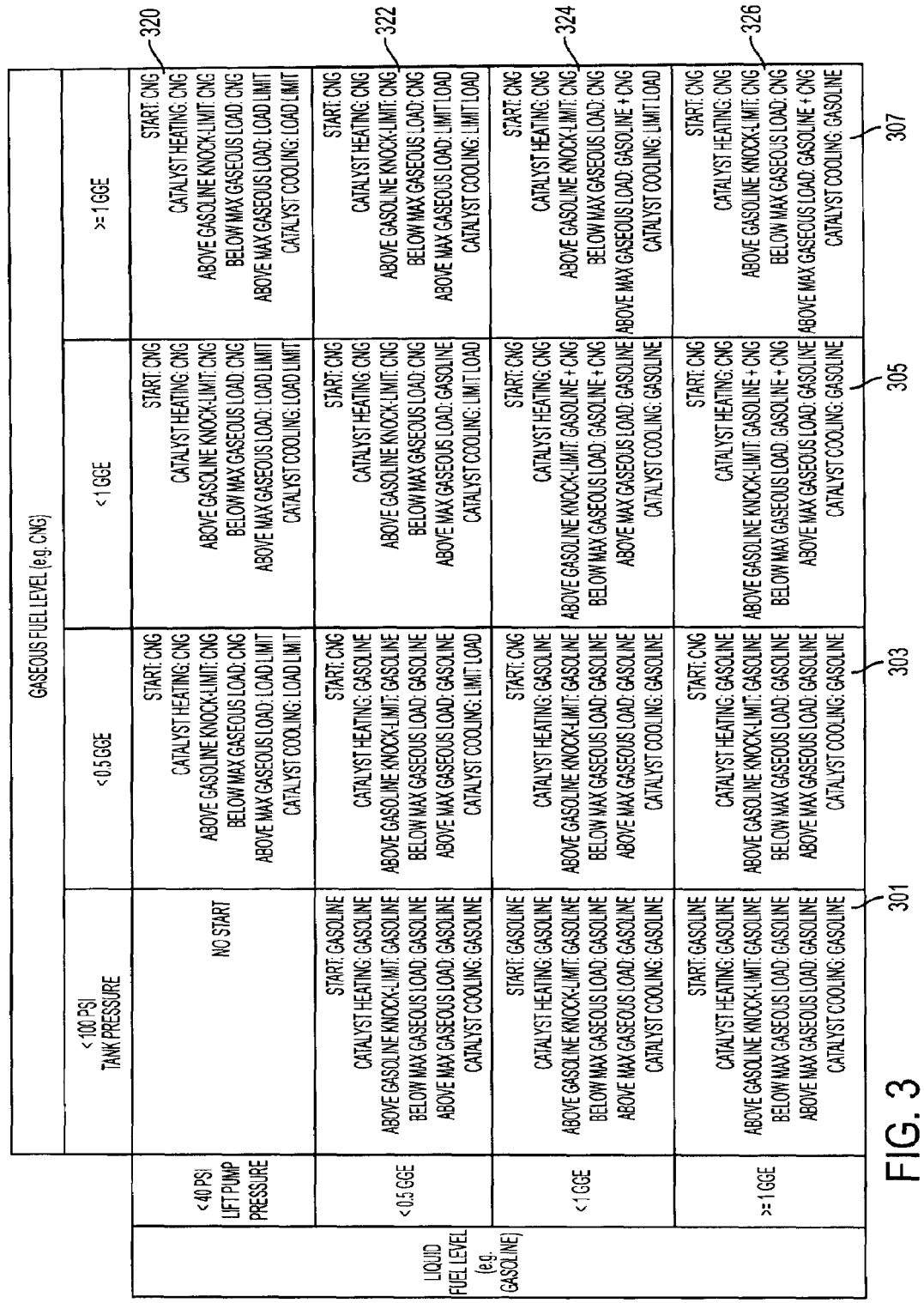
FIG. 3 is table that illustrates one embodiment of a method for selecting a fuel type to deliver to an internal combustion engine having a plurality of available fuel types.

Referring now to FIG. 3, an example fuel control matrix is shown. The matrix columns are labeled 301, 303, 305, and 307. The matrix rows are labeled 320, 322, 324, and 326. Each row and column corresponds to a unique fuel type and quantity of fuel stored in a fuel storage tank. A total of sixteen unique matrix locations (cells) are illustrated in FIG. 3, but the fuel control matrix may be constructed of additional or fewer cells if desired.

In this example, the quantity of stored CNG increases from left to right in the matrix, and the quantity of stored gasoline increases from the matrix top to the matrix bottom.

Each matrix cell, with the exception of the upper left hand cell, has six identified engine modes, and a fuel control mode is associated with each engine mode. For example, the fuel control cell at the intersection of column 303 and row 320, commands the engine to be operated in start mode using only CNG. Furthermore, the engine is operated on CNG during catalyst heating mode, above gasoline knock limit mode, and below maximum gaseous load mode. If the operator requests an engine load that is above the above maximum gaseous load then the engine is load limited by restricting engine air intake or by limiting the minimum amount of CNG supplied to the engine. Likewise, catalyst cooling mode limits the engine load by restricting engine air intake or by limiting the minimum amount of CNG applied to the engine.

On the other hand, the fuel control cell at the intersection of column 301 and row 322, commands the engine to be operated in start mode using only gasoline. And since the quantity of CNG stored in column 301 is low, then engine is operated using gasoline for the remaining engine control modes. Thus, each matrix cell has the possibility of commanding different fuels during engine operating modes in response to fuel type and stored fuel amounts.

It should be noted that the fuel control matrix illustrated in FIG. 3 has an assumption that cost of a CNG GGE is less than a gallon of gasoline. However, a matrix wherein a gallon of gasoline is expected to cost less than a CNG GGE can also be accommodated by simply redefining a few of the fuel types listed in the several fuel modes. For example, if CNG were more expensive than gasoline, CNG might be restricted to engine starting and engine loads that exceed the gasoline load knock limit. Further, as illustrated in the matrix cell identified at the intersection of column 305, row 324, it is possible to fuel a cylinder with two fuel types during a cylinder cycle.

The engine controller may also contain several fuel control matrices that have different column and rows widths depending on different types of fuel that may be combusted. Further, the matrices dimensions and structure may be modified to accommodate different engine configurations.

The methods, routines, and configurations disclosed herein are exemplary and should not be considered limiting because numerous variations are possible. For example, the above disclosure may be applied to I3, I4, I5, V6, V8, V10, and V12 engines operating in natural gas, gasoline, diesel, or alternative fuel configurations.

The following claims point out certain combinations regarded as novel and nonobvious. Certain claims may refer to "an" element or "a first" element or equivalent. However, such claims should be understood to include incorporation of one or more elements, neither requiring nor excluding two or more such elements. Other variations or combinations of claims may be claimed through amendment of the present claims or through presentation of new claims in a related application. The subject matter of these claims should be regarded as being included within the subject matter of the present disclosure.

The invention claimed is:

1. A system for selecting a fuel for an engine, comprising:
a first fuel injector;
a second fuel injector; and
a controller configured to activate and deactivate said first fuel injector and said second fuel injector in response to an amount of a first fuel in a first fuel storage tank, an amount of a second fuel in a second fuel storage tank, and normalized energy properties of said first fuel and said second fuel.

2. The system of claim 1 further comprising said controller activating and deactivating fuel injection to said engine by way of said first fuel injector and said second fuel injector in response to a cost of said first fuel and a cost of said second fuel.

3. The system of claim 1 wherein said first fuel injector is configured to inject a gaseous fuel into said engine and said second fuel injector is configured to inject a liquid fuel to said engine.

4. The system of claim 1 wherein said first fuel injector is deactivated if said engine is started and said first fuel in said first fuel storage device is below a predetermined amount.

5. The system of claim 1 wherein said second fuel injector is deactivated if said engine is operated above a predetermined load and if said amount of said second fuel stored in said second fuel storage tank is less than a predetermined amount.

6. The system of claim 1 wherein said first fuel injector is deactivated to conserve a specific fuel type for the purpose of reducing engine starting emissions.

7. A system for selecting a type of fuel to combust in an internal combustion engine, the system comprising:
a first fuel injector for injecting a first fuel to said internal combustion engine;
a second fuel injector for injecting a second fuel to said internal combustion engine; and
a controller configured to activate and deactivate said first fuel injector and said second fuel injector in response to a cost of said first fuel, an amount of said first fuel stored in a first fuel storage tank, a cost of said second fuel, and an amount of said second fuel stored in a second fuel storage tank.

8. The system of claim 7 wherein said first fuel injector injects a gaseous fuel to said internal combustion engine.

9. The system of claim 7 wherein said second fuel injector injects a liquid fuel to said internal combustion engine.

10. The system of claim 7 wherein said controller deactivates said second fuel injector if said second fuel contained in said second fuel storage tank for delivery to said second fuel injector is less than a first predetermined amount and an engine load is less than a first predetermined amount, and activating said second fuel injector if said second fuel contained in said second fuel storage tank for delivery to said second fuel injector is less that said first predetermined amount and said engine load is above a second predetermined amount.

11. The system of claim 7 wherein said controller maintains said first fuel injector in an active state whereby said first fuel injector periodically injects said first fuel to said internal combustion engine.

12. A system for selecting a type of fuel to combust in an internal combustion engine, the system comprising:
a first fuel injector for injecting a first fuel to said internal combustion engine;
a second fuel injector for injecting a second fuel to said internal combustion engine; and
a controller configured to individually activate and deactivate said first fuel injector and said second fuel injector in response to an amount of a fuel stored and normalized energy properties of said fuel.

13. The system of claim 12 wherein said first fuel injector injects a gaseous fuel to said internal combustion engine.

14. The system of claim 13 wherein said second fuel injector injects a liquid fuel to said internal combustion engine.

15. The system of claim 12 wherein a type of fuel injected from said first fuel injector is related to an allowable engine load when said internal combustion engine is operated in a fuel related load limiting mode.

16. A method for reducing engine emissions of a dual fuel internal combustion engine, the method comprising:
activating and deactivating a first fuel injector capable of supplying fuel to a cylinder of said dual fuel internal combustion engine in relation to a normalized energy property of a first fuel and an amount of said first fuel stored in a first fuel tank and a normalized energy property of a second fuel and an amount of said second fuel stored in a second fuel tank;
activating and deactivating a second fuel injector capable of supplying fuel to said cylinder of said dual fuel internal combustion engine in relation to a normalized energy property of said first fuel and an amount of fuel stored in said first fuel tank and a normalized energy property of said second fuel and an amount of fuel stored in said second fuel tank; and
activating said first fuel injector and said second fuel injector during different engine operating modes.

17. The method of claim 16 wherein said activation and deactivation of said first fuel injector and said second fuel injector is further based upon the operating mode of said dual fuel internal combustion engine.

18. The method of claim 16 wherein a fuel injected by said first fuel injector is a gaseous fuel and wherein a fuel injected by said second fuel injector is a liquid fuel.

19. The method of claim 18 wherein said gaseous fuel is injected only to start said dual fuel internal combustion engine when said amount of said first fuel stored in said first fuel tank is below a predetermined level.

20. A method for controlling fuel a dual fuel engine, comprising:
independently activating and deactivating a first fuel injector and a second fuel injector supplying fuel to a cylinder of said dual fuel engine such that a gaseous fuel is injected to said engine up to an engine load which cannot be increased without leaning a cylinder air-fuel ratio, and said gaseous fuel and a second fuel are injected to said engine at higher engine loads than said engine load which cannot be increased without leaning said cylinder air-fuel ratio.

21. The method of claim 20 wherein said first fuel injector injects a gaseous fuel and wherein said second fuel injector injects a liquid fuel.

22. The method of claim 21 wherein said liquid fuel is injected to cool a catalyst located in an exhaust path of said dual fuel engine when an amount of said liquid fuel stored in a second fuel tank is below a predetermined amount.

* * * * *